United States Patent
Ozturk et al.

(10) Patent No.: US 8,947,809 B2
(45) Date of Patent: Feb. 3, 2015

(54) ENCODING SCHEME FOR BIT PATTERNED MEDIA

(75) Inventors: Mustafa Can Ozturk, Bloomington, MN (US); Puskal Prasad Pokharel, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 963 days.

(21) Appl. No.: 12/233,928

(22) Filed: Sep. 19, 2008

(65) Prior Publication Data

US 2010/0073810 A1    Mar. 25, 2010

(51) Int. Cl.
- *G11B 5/09* (2006.01)
- *G11B 5/596* (2006.01)
- *B82Y 10/00* (2011.01)
- *G11B 5/74* (2006.01)
- *G11B 5/82* (2006.01)

(52) U.S. Cl.
CPC ............ *G11B 5/59688* (2013.01); *B82Y 10/00* (2013.01); *G11B 5/743* (2013.01); *G11B 5/746* (2013.01); *G11B 5/82* (2013.01)
USPC .......................................... 360/48; 360/77.08

(58) Field of Classification Search
None
See application file for complete search history.

(56) References Cited

U.S. PATENT DOCUMENTS

| | | | |
|---|---|---|---|
| 4,549,232 A | 10/1985 | Axmear et al. | |
| 4,912,576 A | 3/1990 | Janz | |
| 5,063,546 A * | 11/1991 | Ito et al. | 369/30.17 |
| 5,420,730 A | 5/1995 | Moon et al. | |
| 5,452,285 A * | 9/1995 | Monen | 369/275.3 |
| 5,473,480 A * | 12/1995 | Ishida | 360/51 |
| 5,587,223 A * | 12/1996 | White | 428/195.1 |
| 5,590,009 A | 12/1996 | Ishida | |
| 5,615,065 A | 3/1997 | Cheung | |
| 6,049,438 A | 4/2000 | Serrano et al. | |
| 6,051,299 A * | 4/2000 | Uchiyama et al. | 428/848.5 |
| 6,162,532 A * | 12/2000 | Black et al. | 428/323 |
| 6,304,398 B1 | 10/2001 | Gaub et al. | |
| 6,440,520 B1 * | 8/2002 | Baglin et al. | 428/847.7 |
| 6,529,341 B1 | 3/2003 | Ishida et al. | |
| 6,535,343 B1 | 3/2003 | Bar-Gadda | |
| 6,628,598 B2 * | 9/2003 | Edwards et al. | 369/99 |
| 6,775,081 B2 | 8/2004 | Ottesen et al. | |
| 6,810,004 B1 * | 10/2004 | Sako | 369/275.4 |
| 6,999,279 B2 | 2/2006 | Lundstrom | |
| 7,009,791 B2 * | 3/2006 | Shimatani | 360/29 |
| 7,119,975 B2 | 10/2006 | Blaum et al. | |
| 7,167,329 B2 | 1/2007 | Baker | |
| 7,218,472 B2 * | 5/2007 | Kaizu et al. | 360/77.02 |
| 7,231,731 B2 * | 6/2007 | Muramatsu et al. | 369/275.3 |
| 7,236,325 B2 * | 6/2007 | Albrecht et al. | 360/77.08 |
| 7,265,922 B2 * | 9/2007 | Biskeborn et al. | 360/55 |
| 7,307,807 B1 | 12/2007 | Han et al. | |
| 7,307,808 B2 * | 12/2007 | Kaizu et al. | 360/75 |
| 7,365,933 B2 | 4/2008 | Hamaguchi et al. | |
| 7,403,353 B2 * | 7/2008 | Tagami et al. | 360/77.08 |

(Continued)

*Primary Examiner* — K. Wong
(74) *Attorney, Agent, or Firm* — HolzerIPLaw, PC

(57) ABSTRACT

A bit patterned media (BPM) encoded recordable medium includes a servo control field including servo bits. Each servo bit is represented by a servo bit pattern of dots and gaps on the recordable medium. In the servo bit patterns, substantially no two dots are placed immediately next to one another, and substantially all servo bit patterns start with a gap and/or substantially all servo bit patterns end with a gap.

23 Claims, 7 Drawing Sheets

(56) References Cited

U.S. PATENT DOCUMENTS

| | | |
|---|---|---|
| 7,443,622 B2 | 10/2008 | Kaizu et al. |
| 7,443,626 B2 * | 10/2008 | Asakura et al. .................. 360/64 |
| 7,492,540 B2 * | 2/2009 | Albrecht .......................... 360/51 |
| 7,522,506 B2 * | 4/2009 | Fasen ............................ 369/101 |
| 7,643,234 B2 * | 1/2010 | Albrecht et al. ................ 360/48 |
| 2006/0215310 A1 | 9/2006 | Zayas |
| 2007/0258161 A1 | 11/2007 | Richter et al. |
| 2007/0281078 A1 | 12/2007 | Kikitsu et al. |

* cited by examiner

# ENCODING SCHEME FOR BIT PATTERNED MEDIA

BACKGROUND

The present invention relates to data storage media and devices, and more particularly to data storage devices including magnetic bit patterned media.

In conventional magnetic data storage media, data bits are recorded using magnetic transitions on a magnetic recording layer that is composed of a random arrangement of single-domain particles. That is, the magnetic recording layer is typically a thin film of a magnetic material that includes a random arrangement of nanometer-scale grains, each of which behaves as an independent magnetic element. Each recorded bit is made up of many (50-100) of these random grains.

A stream of data bits is recorded as regions of opposite magnetization on the magnetic recording layer. As recorded on the medium, the stream of bits generally consists of equally spaced bit cells, with a digital '1' being indicated by a boundary (called a magnetic transition) between regions of opposite magnetization within a bit cell, and a '0' being indicated by a continuous region without such a boundary. The boundaries between regions of opposite magnetization occur along the boundaries between the grains. As the magnetic transitions follow the grain boundaries, the transitions are typically not made along straight lines.

Thus, due to the granular nature of the recording layer, the transitions may not be placed exactly where they are intended. Any deviations in grain boundaries represent medium noise, which limits the density of data that can be recorded on the medium.

If the grains are small enough, the magnetic transitions may be straight enough that it is easy to detect which bit cells contain a boundary and which do not. However, if the recording density is increased for a given grain size, the magnetic transitions become proportionally noisier, reducing the ability of the system to accurately recover the data.

One way to reduce the medium noise is to reduce the grain size. However, due to the superparamagnetic effect, the grain size has a lower physical limit. The superparamagnetic effect refers to the tendency of a grain's magnetization to reverse when the product of the grain volume and its anisotropy energy fall below a certain value. That is, as the grain volume decreases, the magnetization of the grain can become unstable.

An alternative to conventional magnetic recording approaches is to use a bit patterned media (BPM) technique. In bit patterned media, the bits do not contain as many grains as those in conventional media. Instead, bit patterned media comprise arrays of magnetic islands which are defined on a nonmagnetic disk surface during manufacturing. The magnetic islands can be magnetized to a desired polarity one at a time by a magnetic field generated by a write head passing over the islands. The magnetic islands (referred to herein as "dots") are physically separated from each other by regions non-magnetic material. These nonmagnetic regions are referred to herein as "gaps" or "spaces." Thus, the magnetic field generated by a write head in response to a write current can only change the magnetization of the dots, while the gaps remain unmagnetized. The magnetic islands can be formed, for example, through lithography when the disk is manufactured.

Each island, or transition between islands, may represent one bit of information. For example, a positive polarity may represent a data '1', while a negative polarity represents a data '0.' Alternatively, a transition from an island having a first polarity to an adjacent island having a different polarity may represent a data '1', while a transition from an island having a first polarity to an adjacent island having the same polarity may represent a data '0.' The signal-to-noise ratio of a bit patterned medium is determined by variations in the spacing and sizing of islands, and can be improved considerably beyond that of conventional media recording schemes.

FIG. 1A is a simplified diagrammatic representation of a top view of a disk 34 having a surface 36 which has been formatted to be used in conjunction with a sectored servo system (also known as an embedded servo system). Data is stored on the disks 34 within a number of concentric tracks (or cylinders, in the case of a multi-disk stack) 40a-h on the disk surface 36. Each track 40a-h is divided into a plurality of sectors 42 separated by radially extending spokes 43. Each sector 42 is further divided into a servo sector 42a and a data sector 42b. The servo sectors of the disk 34 are used, among other things, to accurately position the read/write head so that data can be properly written onto and read from the disk 34. The data sectors 42b are where non-servo related data (i.e., host device data) is stored and retrieved. Although FIG. 1A only shows a relatively small number of tracks for ease of illustration, it should be appreciated that typically tens of thousands of tracks are included on the surface 36 of a disk 34.

The servo sectors 42a in each track 40 are radially aligned with servo sectors 42a in the other tracks, thereby forming servo wedges 45 which extend radially across the disk 34 (e.g., from the disk's inner diameter 44 to its outer diameter 46).

FIG. 1B is a view of a track 40 including sectors 42, each of which includes a servo sector 42a and a data sector 42b, from the frame of reference of a read/write head of the disk drive. The cross-track direction (i.e., moving from the inner diameter ID of a disk to the outer diameter OD, or vice-versa) is perpendicular to the track 40, while the down-track direction is parallel to the track 40.

FIG. 1C illustrates exemplary servo information 80 that may be stored in at least some of the servo sectors 42a within the radial sectors 42. The servo information 80 can include various servo control fields, such as a preamble field 82, a servo address mark (SAM) field 84, a track number field indicated by its least significant bits (LSBs) 86, a spoke number field 88, an entire track number field 90 which may be recorded in at least one of the servo spokes, and a servo burst field 92 of circumferentially staggered radially offset servo bursts (e.g., A, B, C, D servo bursts).

FIG. 1D illustrates a BPM configuration including a regular array of rows 13 of patterned magnetic islands (i.e. dots) 11 on a disk surface 15. In the data sector 42b of a disk track 42, a write head can be moved along a row 13 of islands 11 and switched or pulsed with electric current to cause the desired recording of data by magnetizing each island to a desired polarization (e.g. a positive or negative polarization). In practice, the arrangement of magnetic islands in the data regions can be different from the pattern shown in FIG. 1D, however.

SUMMARY

A recordable medium according to some embodiments includes a servo control field including servo bits. Each servo bit is represented by a servo bit pattern of dots and gaps on the recordable medium in which substantially no two dots are placed immediately next to one another, and substantially all servo bit patterns start with a gap and/or substantially all servo bit patterns end with a gap. Each servo bit may be encoded with a dot field having a dot field size of three or more dot positions. In some embodiments, the servo bit pattern may have a dot field size of 4 or more dot positions.

A servo control system according to some embodiments includes a recordable medium including a servo control field including a plurality of servo bits. Each servo bit is represented by a servo bit pattern of dots and gaps on the recordable medium in which substantially no two dots are placed immediately next to one another, and substantially all servo bit patterns start with a gap and/or substantially all servo bit patterns end with a gap. The system further includes a transducer that detects the dots and gaps on the recordable medium and responsively generates a readback signal, and a servo controller that controls a position of the transducer in response to a readback signal from the transducer.

Methods of writing a servo control field on a recordable medium according to some embodiments include writing a plurality of servo bits in a servo control field on the recordable medium. Each servo bit in the servo control field is represented by a servo bit pattern of dots and gaps on the recordable medium in which substantially no two dots are placed immediately next to one another, and substantially all servo bit patterns start with a gap and/or substantially all servo bit patterns end with a gap.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION OF EMBODIMENTS OF THE INVENTION

Figure 1A:
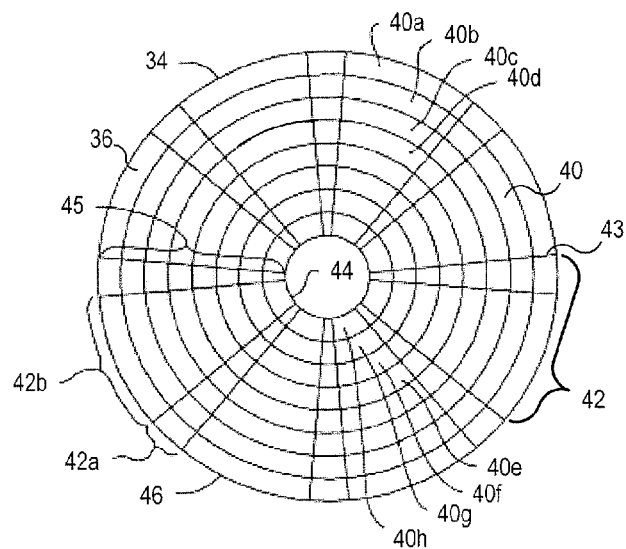
FIGS. 1A and 1B illustrate a layout of a disk surface.
Figure 1B:
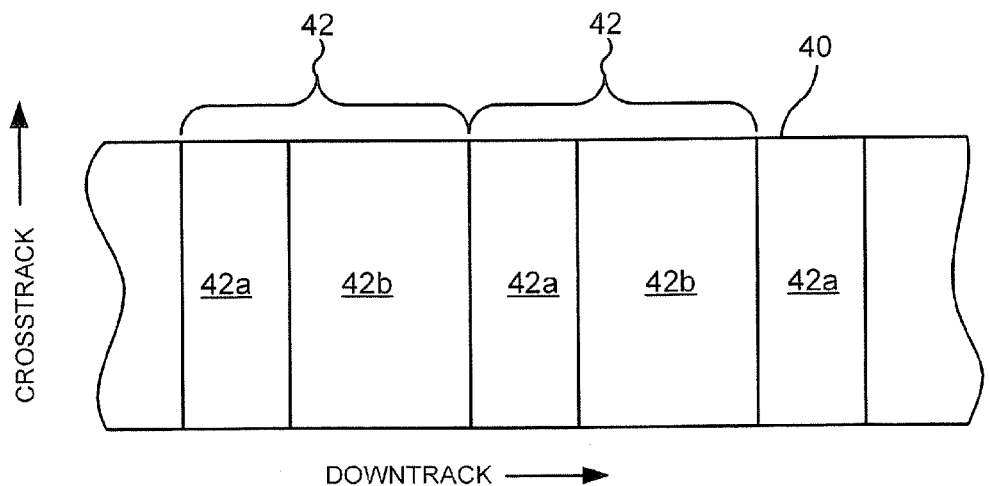
Figure 1C:
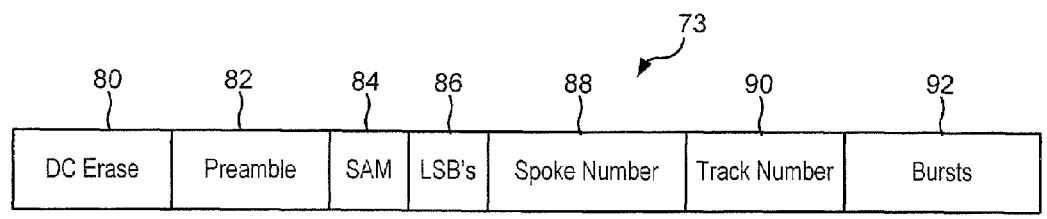
FIG. 1C illustrates exemplary servo control data that may be stored in at least some of the servo spokes of a disk drive.
Figure 1D:
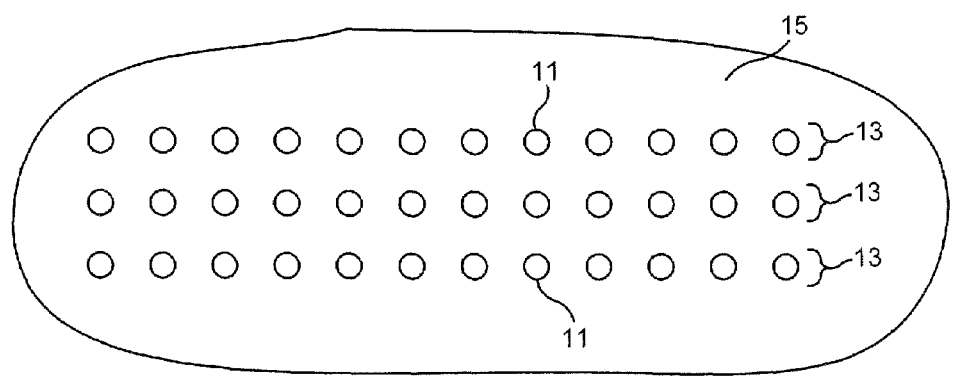
FIG. 1D illustrates a bit patterned media (BPM) configuration including a regular array of patterned bits on a magnetic recording layer.

Various embodiments will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

It will be understood that, although the terms first, second, etc. may be used herein to describe various elements, these elements should not be limited by these terms. These terms are only used to distinguish one element from another. For example, a first region/element/value could be termed a second region/element/value, and, similarly, a second region/element/value could be termed a first region/element/value without departing from the teachings of the disclosure.

Some embodiments may be embodied in hardware and/or in software (including firmware, resident software, micro-code, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium that is executable by a processor to perform functionality described herein. Accordingly, as used herein, the terms "circuit" and "module" may take the form of digital circuitry, such as computer-readable program code executed by a processor (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Although various embodiments of the present invention are described in the context of disk drives for purposes of illustration and explanation only, the present invention is not limited thereto. It is to be understood that the present invention can be more broadly used for any type of servo control loop that positions a sensor responsive to servo control bursts on a movable medium.

As noted above, a disk track includes data sectors and servo sectors. In a disk using a Bit Patterned Media (BPM) recording scheme having a pattern of magnetic islands, or dots, on the disk surface, data is stored in the data sectors by selectively magnetizing the dots in a desired pattern. In contrast to data sectors, information in the servo sectors may be defined at the time of disk manufacture. Moreover, rather than being encoded in magnetic transitions from dot to dot, information in the servo sectors can be encoded by the physical arrangement of dots and gaps on the disk surface. That is, servo information can be encoded in the spacing and/or sizing of dots on the disk surface. As such information may be independent of magnetic polarity, all dots in the servo sectors may be DC erased, or set to a single polarity by a DC field.

In bit patterned media (BPM), servo control bits, such as bits stored in the SAM, Spoke Number, or Track Number fields, for example, are typically recorded using wide bi-phase encoding. In wide bi-phase encoding, servo bits '0' and '1' are represented by gap-dot pairs. For example, a '0' may be represented by a gap followed by a dot (i.e. a "G-D"), while a '1' may be represented by a dot followed by a gap (i.e. a "D-G"). Thus, for example, a servo bit sequence of '0010' will be represented by a sequence of gap-dot-gap-dot-dot-gap-gap-dot ("G-D-G-D-D-G-G-D"). Thus, the servo bit sequence of '0010' will be represented by a series that includes two adjacent dots.

Figure 2:
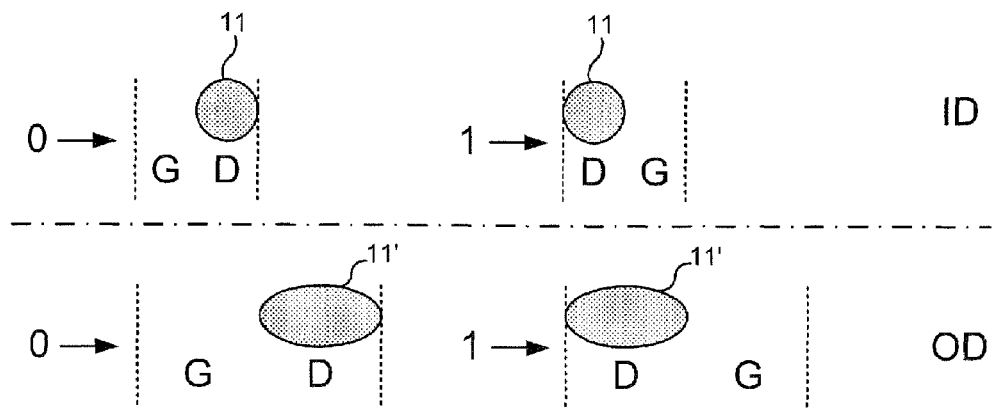
FIG. 2 illustrates a dot topology for a standard wide bi-phase encoding system at an inner diameter (ID) of a magnetic storage disk and an outer diameter (OD) of the disk.

FIG. 2 illustrates a dot topology for a standard wide bi-phase encoding system at an inner diameter (ID) of a magnetic storage disk and an outer diameter (OD) of the disk. In the example illustrated in FIG. 2, the radius at the outer diameter is assumed to be twice the radius at the inner diameter, although it will be appreciated that other configurations are possible. As illustrated in FIG. 2, at the inner diameter, the aspect ratio of dots 11 is 1. That is, the dots are as wide as they are high. In order to maintain a constant servo frequency over a stroke from the inner diameter to the outer diameter, the aspect ratio of the dots 11' may be increased at the outer diameter to form an ellipse having an aspect ratio of about 2:1. That is, in FIG. 2, the gaps G at the outer diameter have a width that is about twice the width of gaps G at the inner diameter. Likewise, the dots D at the outer diameter have a width that is about twice the width of dots D at the inner diameter. In practice, this configuration can be implemented as two dots placed next to each other or an ellipse with an aspect ratio of about 2:1 as shown in FIG. 2.

Although FIG. 2 and subsequent figures illustrate dots D and gaps G having similar widths at a given radial location (e.g. at the inner diameter or the outer diameter), it will be appreciated that the physical length of dots and gaps at a particular radial location on the recordable medium may be different (i.e. gaps at a given radial location can have the same length as dots or can have different lengths than dots at the radial location).

Figure 3:
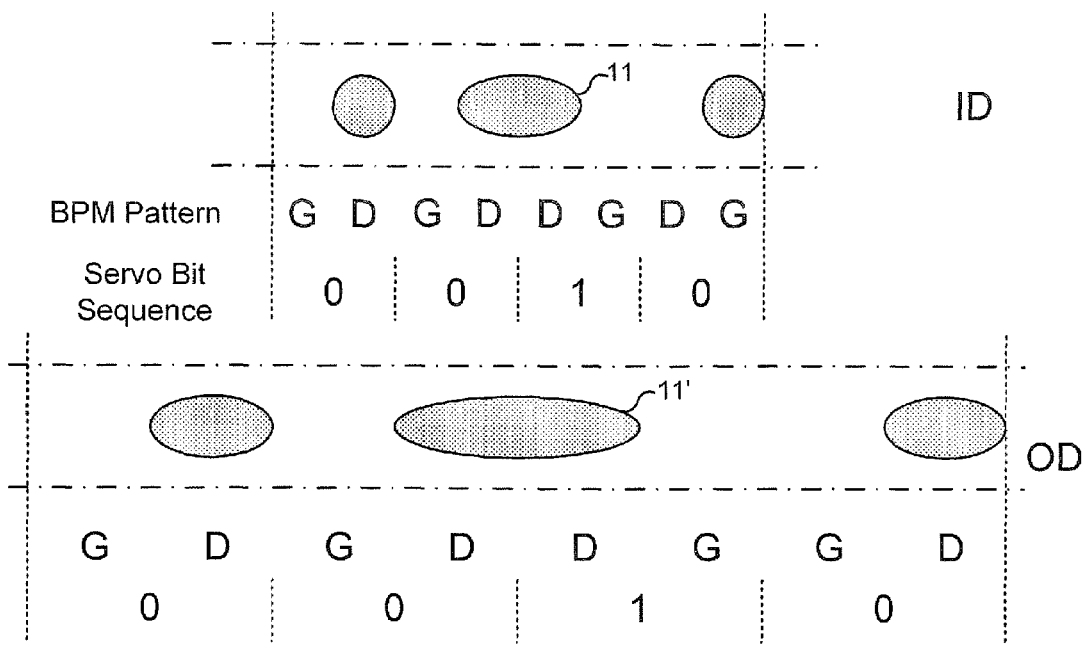
FIG. 3 illustrates an example of encoding a servo bit sequence of '0010' using wide bi-phase encoding.

Referring to FIG. 3, when the servo bit sequence of '0010' is encoded in a BPM approach using wide bi-phase encoding, adjacent dots 11 at the inner diameter may form a single domain having a 2:1 aspect ratio. However, at the outer diameter, the adjacent dots 11' may form a single domain having a 4:1 aspect ratio. That is, as the dots are elongated in the down-track direction to keep the servo frequency constant, the adjacent dots 11' may form a domain having an aspect ratio of 4:1 at the outer diameter.

A magnetic domain in a BPM system having an aspect ratio of greater than 4:1 may lose single domain behavior, potentially resulting in poor signal quality and/or digital detection errors.

According to some embodiments, a servo control field in a recordable medium includes a plurality of servo bits. Each servo bit is represented by a servo bit pattern of dots and gaps on the recordable medium. In the servo bit patterns at the inner diameter, substantially no two dots are placed immediately next to one another. Furthermore, all servo bit patterns start with a gap and/or all servo bit patterns end with a gap. Accordingly, when servo data is encoded on the disk in any pattern, no two dots may be placed next to one another. Thus, when the aspect ratio of dots is increased to provide a substantially constant servo frequency from an inner diameter of a disk to an outer diameter of a disk, the aspect ratio of the dots may not be increased beyond a point where the dots can lose single domain behavior. As noted above, the aspect ratio of dots can be increased by forming two dots very close together or by forming an ellipse having a desired aspect ratio.

It will be further appreciated that a servo bit pattern as described herein may be used to encode all or less than all servo control fields on a data storage disk. For example, one servo control field, such as the SAM field 84, may be encoded using a servo bit pattern as described herein, while another servo control field, such as the preamble 82, may be encoded using a conventional encoding scheme, such as wide bi-phase.

In some embodiments, each servo bit in a servo control field may be encoded with a dot field having a dot size of three or more dot positions. The dot field may include a plurality of dot locations, and a dot location that is occupied in a zero servo bit may not be occupied in a one servo bit, and vice-versa.

Furthermore, by using an encoding scheme according to some embodiments, a fundamental frequency of a readback signal generated in response to the servo control field may be less, and in some cases significantly less, than a data frequency of data encoded in a data field adjacent the servo control field, which may increase reliability of the servo operation.

Figure 4A:
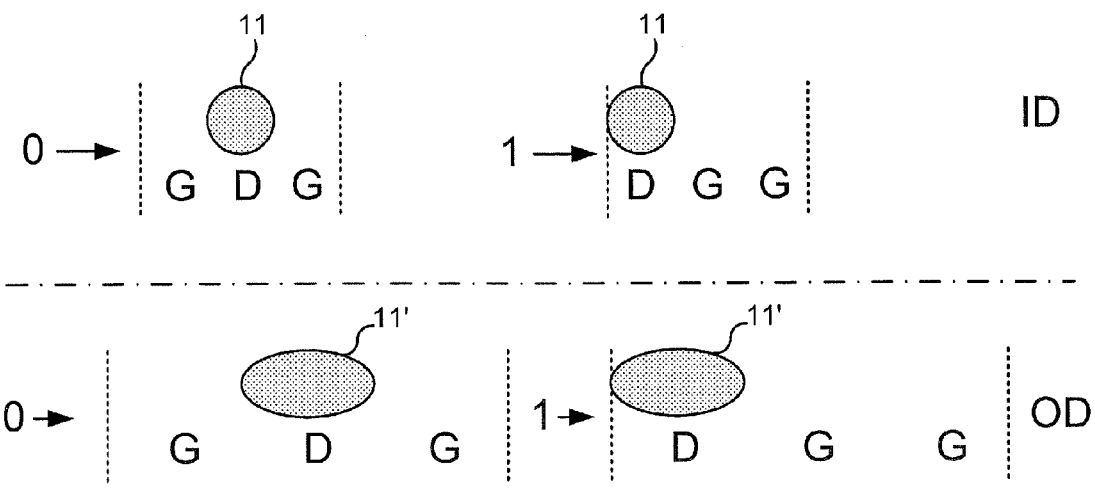
FIGS. 4A and 4B illustrate examples of encoding schemes according to various embodiments.
Figure 4B:
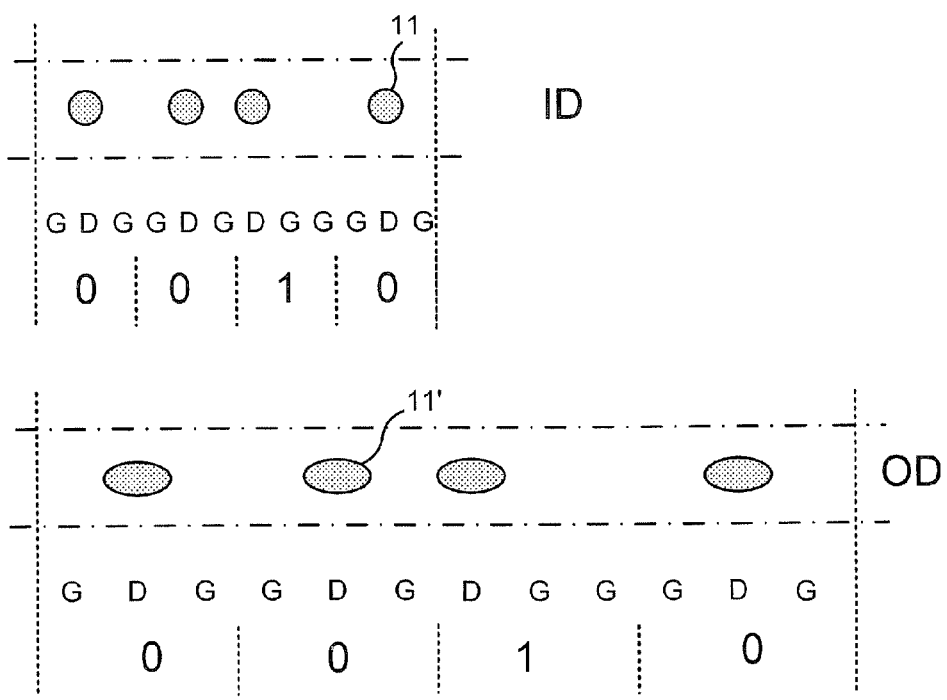

Examples of encoding schemes according to various embodiments are illustrated in FIGS. 4A and 4B. As shown therein, a servo bit '0' can be represented (using a three dot size bit length) by a gap-dot-gap pattern (G-D-G), while a servo bit '1' can be represented by a dot-gap-gap (D-G-G) pattern or, alternatively, a gap-gap-dot (G-G-D) pattern. In the first case, both the encoded '1' and the encoded '0' servo bits end with a gap, while in the second case, both the encoded '1' and the encoded '0' servo bits start with a gap.

FIG. 4B illustrates encoding of a servo bit sequence of '0010' using the encoding scheme of FIG. 4A. As shown in FIG. 4B, at the outer diameter, the encoded servo bits include dots 11' having an aspect ratio of 2:1.

Figure 5:
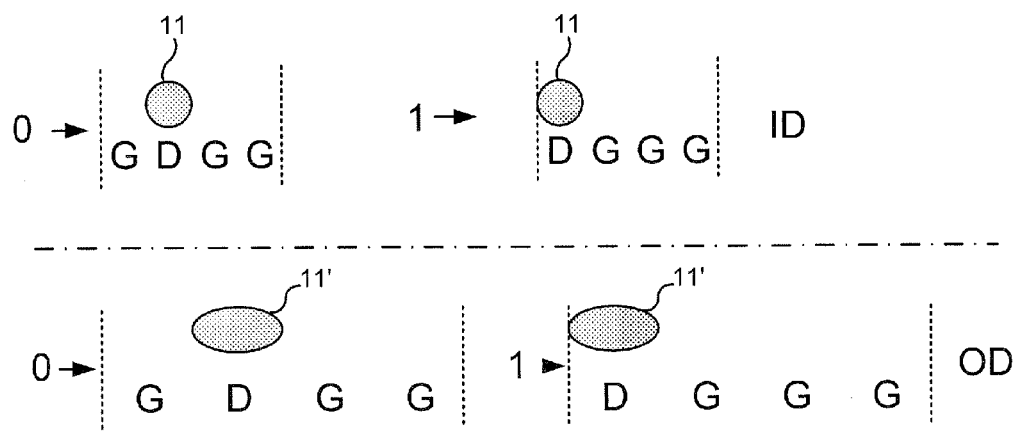
FIG. 5 illustrates a possible 4-dot size BPM encoding pattern according to some embodiments.

Other encoding schemes are possible according to some embodiments. For example, a BPM encoding scheme according to some embodiments can have a 4-dot size, 8-dot size, 16-dot size or other size dot length. An example of an encoding scheme employing a 4-dot size is illustrated in FIG. 5. As shown therein, a servo bit '0' can be represented by a gap-dot-gap-gap pattern (G-D-G-G), while a servo bit '1' can be represented by a dot-gap-gap-gap (D-G-G-G) pattern. Alternatively, a servo bit '0' can be represented by a gap-gap-dot-gap pattern (G-G-D-G), while a servo bit '1' can be represented by a gap-dot-gap-dot (G-D-G-D) pattern. Accordingly, in some embodiments, a dot location that is occupied in a zero servo bit may not be occupied in a one servo bit, and vice-versa.

Figure 6:
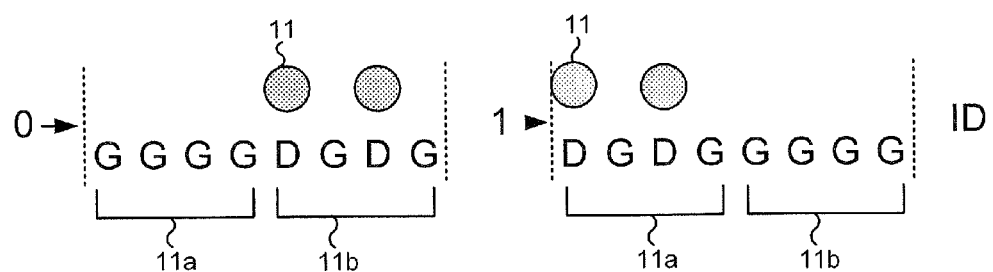
FIG. 6 illustrates a possible 8-dot size BPM encoding pattern according to some embodiments.

FIG. 6 illustrates a possible 8-dot size BPM encoding pattern, although it will be appreciated that many other 8-dot size patterns are possible. As with the previous patterns, the encoded bits each end with a gap, so that no encoded series of servo data bits can have two consecutive dots. Furthermore, the servo bit pattern illustrated in FIG. 6 includes four leading dot positions 11a and four trailing dot positions 11b. Dots of the dot pattern indicative of a data zero are located only within the trailing dot positions 11b, while dots of the dot pattern indicative of a data one are located only within the leading dot positions 11a. It will be appreciated that in some embodiments, dots of the dot pattern indicative of a data zero may be located only within the leading dot positions 11a, while dots of the dot pattern indicative of a data one may be located only within the trailing dot positions 11b.

The 8-dot size pattern illustrated in FIG. 6 can provide some additional benefits in servo control system. Assuming that there are four samples per bit length, the servo pattern frequency can be reduced by a factor of 4 compared to standard wide bi-phase encoding. That is, the servo sampling frequency can be reduced to a frequency that is one-half of the frequency of data stored on the recordable medium. In general, in a servo controlled data storage system, it may be desirable for the servo frequency to be lower than the data frequency, which can increase reliability of the servo control system. In particular, it may be beneficial to perform servo control at a lower frequency than the data frequency, because estimates of off-track location of a read/write head can be more accurate when the signal quality of the servo control signal is better. Furthermore, electronic elements, such as filters, amplifiers, etc., in the servo control loop can operate better and/or more efficiently at frequencies that are lower than the data frequency in a high-storage density device.

Figure 7:
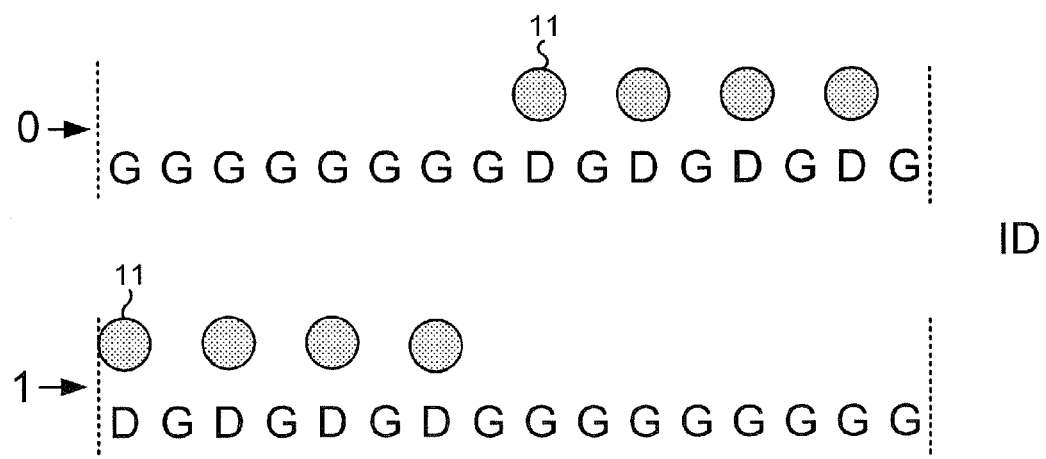
FIG. 7 illustrates a possible 16-dot size BPM encoding pattern according to some embodiments.

FIG. 7 illustrates a possible 16-dot size BPM encoding pattern, although it will again be appreciated that many other 16-dot size patterns are possible. As with the 8-dot size pattern illustrated in FIG. 6, dots of the dot pattern indicative of a data zero are located only within the trailing dot positions, while dots of the dot pattern indicative of a data one are located only within the leading dot positions.

In the case of the 16-dot size BPM encoding pattern as shown in FIG. 7, the servo sampling frequency may be reduced by a factor of 8 compared to standard wide bi-phase encoding. For example, the readback signal that is generated in response to the BPM encoding pattern illustrated in FIG. 7 can be sampled only four times over the entire 16 dot period. The readback signal will have a sinusoidal shape with a fundamental frequency that is 1/16 of the data frequency, or 1/8 of the servo frequency that would be obtained for a servo data field encoded using wide bi-phase encoding. This allows the servo control system to operate at a significantly lower frequency than the data frequency.

Figure 8:
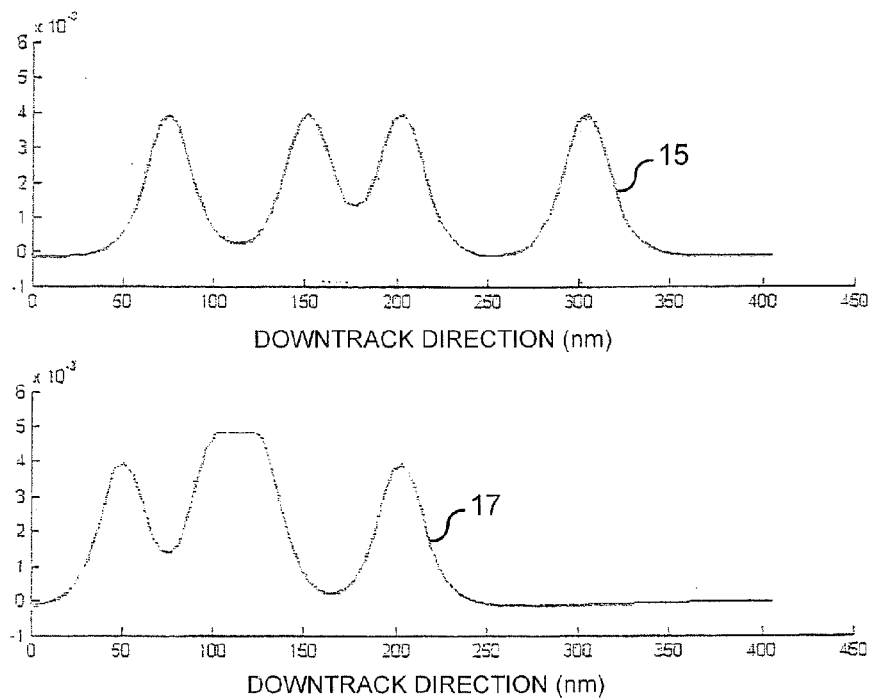
FIG. 8 illustrates readback signals for servo sequences encoded using wide bi-phase encoding and BPM encoding according to some embodiments.

FIG. 8 graphically illustrates changes in the readback signal that can be obtained by using a BPM encoding scheme according to some embodiments. In particular, FIG. 6 is a graph of readback signal versus distance (in nanometers) for a bit sequence of '0010' encoded using a 3-dot size BPM encoding method according to some embodiments (curve 15) and using a standard wide bi-phase encoding method (curve 17). In the system illustrated in FIG. 8, dots are written on the recording surface with a nominal dot size of 25.4 nm, for a density of 250 Gdpsi (dots per square inch).

As illustrated in FIG. 8, the readback signal 15 has distinct peaks corresponding to the dots in the encoded sequence, while in the readback signal 17, two adjacent dots blend together to form a single peak.

Figure 9:
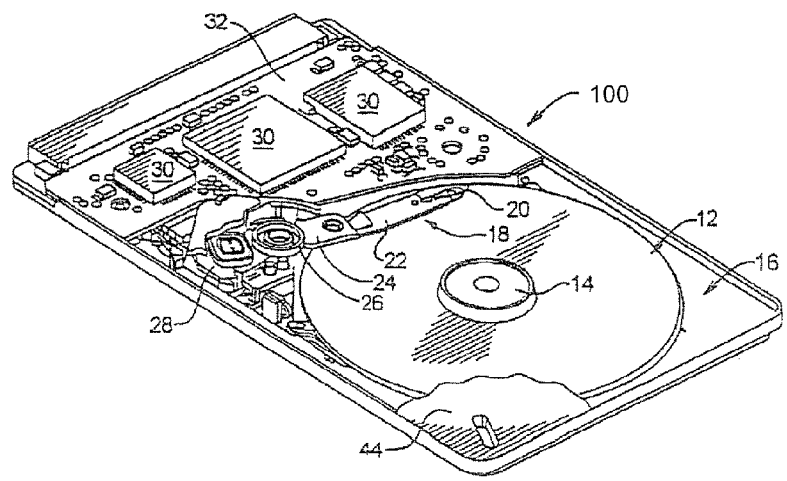
FIG. 9 is a simplified diagrammatic view of a disk drive according to some embodiments.

A simplified diagrammatic representation of a disk drive, generally designated as 100, is illustrated in FIG. 9. The disk drive 100 includes a disk stack 12 (illustrated as a single disk in FIG. 9) that is rotated about a hub 14 by a spindle motor mounted to a base plate 16. The disk stack 12 includes a plurality of disks. An actuator arm assembly 18 is also mounted to the base plate 16. The disk drive 100 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disk drive 100.

The actuator arm assembly 18 includes one or more read/write heads (or transducers) 20 mounted to a flexure arm 22 which is attached to an actuator arm 24 that can rotate about a pivot bearing assembly 26. The transducers 20 may, for example, include a magnetoresistive (MR) element and/or a thin film inductive (TFI) element. The actuator arm assembly 18 also includes a voice coil motor (VCM) 28 which radially moves the transducers 20 across the disk stack 12. The spindle motor 15 and actuator arm assembly 18 are coupled to a controller, read/write channel circuits, and other associated electronic circuits 30 which can be enclosed within one or more integrated circuit packages mounted to a printed circuit board (PCB) 32. The controller, read/write channel circuits, and other associated electronic circuits 30 are referred to below as a "controller" for brevity. The controller 30 may include analog circuitry and/or digital circuitry, such as a gate array and/or microprocessor-based instruction processing device.

Figure 10:
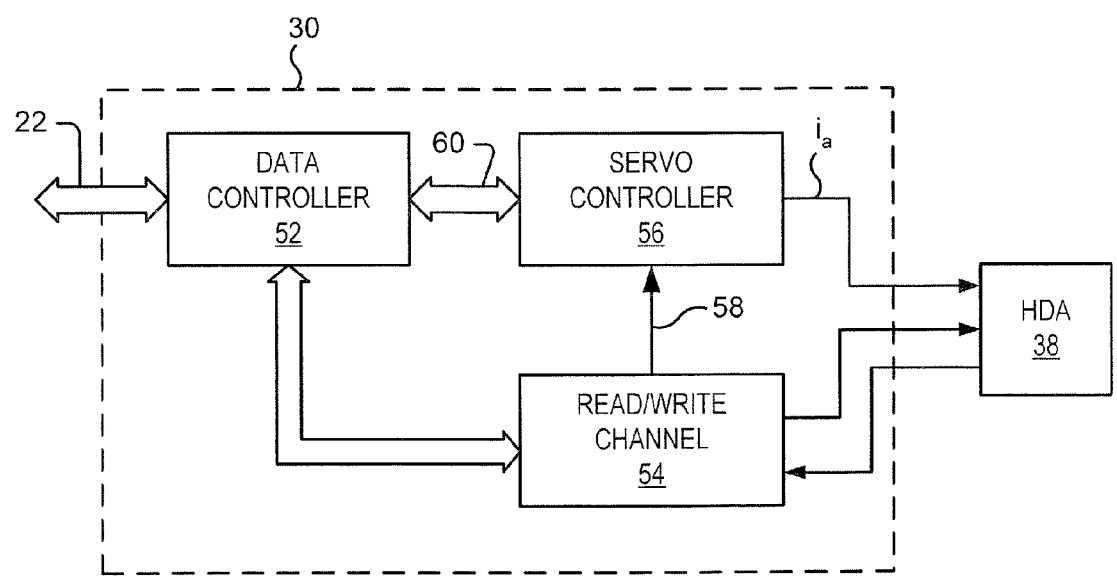
FIG. 10 is a block diagram illustrating drive electronics of a disk drive according to some embodiments.

FIG. 10 is a block diagram of a portion of the drive electronics 30 of the disk drive 100 shown in FIG. 9 that is communicatively connected to a host device. The drive electronics 30 can include a data controller 52, a servo controller 56, and a read write channel 54. Although the controllers 52 and 56, and the read write channel 54 have been shown as separate blocks for purposes of illustration and discussion, it is to be understood that their functionality described herein may be integrated within a common integrated circuit package or distributed among more than one integrated circuit package. The head disk assembly (HDA) 38 can include a plurality of the disks 34, a plurality of the transducers 20 mounted to the actuator arm assembly 22 and positioned adjacent to different data storage surfaces of the disks 34, the VCM 28, and the spindle motor.

A data transfer to/from the disk drive 100 may involve, for example, a DMA transfer of data from a host memory onto a system bus. Data from the system bus are transferred onto an I/O bus 22. The data are read from the I/O bus 22 by the data controller 52, which formats the data into blocks with the appropriate header information and transfers the digital data to the read/write channel 54.

The read/write channel 54 can operate in a conventional manner to convert data between the digital form used by the data controller 52 and the analog form used by the transducers 20. For the transfer from the CPU to the HDA 38, the read/write channel 54 converts the data to an analog form suitable for writing by the transducers 20 to the HDA 38. The read/write channel 54 also provides servo positional information read from the HDA 38 to the servo controller 56 on lines 58. For example, the concentric data tracks 40 on the storage surface 36 of a data storage disk 34 can be broken up and divided into segments by a multiplicity of regularly spaced apart embedded servo sectors 42a (FIG. 10). Each servo sector 42a can include transducer location information such as a track identification field and data block address, for identifying the track and data block, and burst fields to provide fine servo location information. The transducer location information can be used to detect the location of the transducers 20 in relation to that track and data block within the track. The transducer location information is induced into the transducers 20, converted from analog signals to digital data in the read/write channel 54, and transferred to the servo controller 56. The servo controller 56 can use the transducer location information for performing seeking and track following operations of the transducers 20 over the disk tracks 40.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A device, comprising:
a servo control field comprising a plurality of servo bits, wherein each servo bit is represented by a servo bit pattern of dots and non-magnetic gaps on the device in which substantially no two dots are placed immediately next to one another, and wherein substantially all servo bit patterns start with a non-magnetic gap and/or substantially all servo bit patterns end with a non-magnetic gap.

2. The device of claim 1, wherein each servo bit is encoded with a dot field having a dot field size of three or more dot positions.

3. The device of claim 2, wherein the dot field includes a plurality of dot locations, and wherein a dot location that is occupied in a dot pattern indicative of a data zero is not occupied in a dot pattern indicative of a data one, and vice-versa.

4. The device of claim 1, wherein the device comprises a magnetic disk including a plurality of concentric circular tracks, each of which comprises a plurality of sectors including a data sector and a servo sector, and wherein the servo control field is located in at least one of the servo sectors.

5. The device of claim 1, wherein a fundamental frequency of a readback signal generated in response to the servo control field is less than a data frequency of data encoded in a data field adjacent the servo control field.

6. The device of claim 1, wherein the pattern of dots and gaps comprises a bit patterned media (BPM) configuration.

7. The device of claim 1, wherein each servo bit is encoded with a dot field having a dot field size on the device of 4 or more dot positions.

8. The device of claim 1, wherein each servo bit is encoded with a dot field having a dot field size on the device of 8 or more dot positions including a plurality of leading dot positions and a plurality of trailing dot positions, and wherein dots of a dot pattern indicative of a data zero are located only within the leading dot positions and dots of a dot pattern indicative of a data one are located only within the trailing dot positions, or dots of a dot pattern indicative of a data zero are located only within the trailing dot positions and dots of a dot pattern indicative of a data one are located only within the leading dot positions.

9. The device of claim 1, wherein the servo control field comprises a first servo control field at an inner diameter of the device, the device further comprising:
a second servo control field at an outer diameter of the device, the second servo control field comprising a plurality of servo bits, wherein each servo bit is represented by a servo bit pattern of dots and gaps on the device, and wherein substantially all servo bit patterns start with a gap and/or substantially all servo bit patterns end with a gap, and wherein the dots of the second servo control field have an aspect ratio that is larger than an aspect ratio of the dots of the first servo control field.

10. A servo control system, comprising:
a device comprising a servo control field including a plurality of servo bits, wherein each servo bit is represented by a servo bit pattern of dots and non-magnetic gaps on the device in which substantially no two dots are placed immediately next to one another, and wherein substantially all servo bit patterns start with a non-magnetic gap and/or substantially all servo bit patterns end with a non-magnetic gap;
a transducer that detects the dots and gaps on the device and responsively generates a readback signal; and
a servo controller that controls a position of the transducer in response to a readback signal from the transducer.

11. The servo control system of claim 10, wherein each servo bit is encoded with a dot field having a dot field size of three or more dot positions.

12. The servo control system of claim 11, wherein the dot field includes a plurality of dot locations, and wherein a dot location that is occupied in a dot pattern indicative of a data zero is not occupied in a dot pattern indicative of a data one, and vice-versa.

13. The servo control system of claim 10, wherein the device comprises a magnetic disk including a plurality of concentric circular tracks, each of which comprises a plurality of sectors including a data sector and a servo sector, and wherein the servo control field is located in at least one of the servo sectors.

14. The servo control system of claim 10, wherein a fundamental frequency of a readback signal generated in response to the servo control field is less than a data frequency of data encoded in a data field adjacent the servo control field.

15. The servo control system of claim 10, wherein the pattern of dots and gaps comprises a bit patterned media (BPM) configuration.

16. The servo control system of claim 10, wherein each servo bit is encoded with a dot field having a dot field size of 4 or more dot positions.

17. The servo control system of claim 10, wherein each servo bit is encoded with a dot field having a dot field size of 8 or more dot positions including a plurality of leading dot positions and a plurality of trailing dot positions, and wherein dots of a dot pattern indicative of a data zero are located only within the leading dot positions and dots of a dot pattern indicative of a data one are located only within the trailing dot positions, or dots of a dot pattern indicative of a data zero are located only within the trailing dot positions and dots of a dot pattern indicative of a data one are located only within the leading dot positions.

18. A method of writing a servo control field on a device, comprising:
writing a plurality of servo bits on the device, wherein each servo bit is represented by a servo bit pattern of dots and non-magnetic gaps on the device in which substantially no two dots are placed immediately next to one another, and wherein substantially all servo bit patterns start with a non-magnetic gap and/or substantially all servo bit patterns end with a non-magnetic gap.

19. The method of claim 18, further comprising:
encoding each servo bit with a dot field having a dot field size of three or more dot positions;
wherein the dot field includes a plurality of dot locations, and wherein a dot location that is occupied in a dot pattern indicative of a data zero is not occupied in a dot pattern indicative of a data one, and vice-versa.

20. The method of claim 18, further comprising:
encoding each servo bit with a dot field having a dot field size of 8 or more dot positions including a plurality of leading dot positions and a plurality of trailing dot positions, wherein dots of a dot pattern indicative of a data zero are located only within the leading dot positions and dots of a dot pattern indicative of a data one are located only within the trailing dot positions, or dots of a dot pattern indicative of a data zero are located only within the trailing dot positions and dots of a dot pattern indicative of a data one are located only within the leading dot positions.

21. The device of claim 1, wherein the device is a recordable medium.

22. The servo control system of claim 10, wherein the device is a recordable medium.

23. The method of claim 18, wherein the device is a recordable medium.

* * * * *